United States Patent
Wang et al.

(10) Patent No.: US 9,335,215 B2
(45) Date of Patent: May 10, 2016

(54) METHOD AND SYSTEM FOR GAS TEMPERATURE MEASUREMENT

(75) Inventors: Guanghua Wang, Clifton Park, NY (US); Nirm Velumylum Nirmalan, Niskayuna, NY (US); Todd Garrett Wetzel, Niskayuna, NY (US); Ronald Scott Bunker, Waterford, NY (US); Robert Michael Zacharias, Fountain Inn, SC (US); Shawn David Wehe, Niskayuna, NY (US); Robert David Briggs, West Chester, OH (US); Jonathan Edward Slepski, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 641 days.

(21) Appl. No.: 13/563,024

(22) Filed: Jul. 31, 2012

(65) Prior Publication Data
US 2014/0033737 A1 Feb. 6, 2014

(51) Int. Cl.
*G01J 5/00* (2006.01)
*G01K 1/14* (2006.01)
*G01K 13/00* (2006.01)
(Continued)

(52) U.S. Cl.
CPC .............. *G01J 5/0014* (2013.01); *F01D 17/085* (2013.01); *F02C 9/28* (2013.01); *G01J 5/0896* (2013.01); *G01J 5/602* (2013.01); *F05D 2260/80* (2013.01);
(Continued)

(58) Field of Classification Search
USPC .................. 374/121, 130, 141, 144, 148, 137
See application file for complete search history.

(56) References Cited

U.S. PATENT DOCUMENTS 4,780,832 A * 10/1988 Shah ............................ 702/130
5,265,036 A * 11/1993 Suarez-Gonzalez et al. . 702/134
(Continued)

FOREIGN PATENT DOCUMENTS

JP       10153488 A       6/1998
JP       2008249462 A     10/2008

OTHER PUBLICATIONS

L. P. Goss, et al., Thin-Filament Pyrometry: A Novel Thermometric Technique for Combusting Flows, Transactions of the ASME, 1989, 7 pages, vol. 111, Issue 46, Systems Research Laboratories, Dayton, OH.

(Continued)

*Primary Examiner* — Mirellys Jagan
(74) *Attorney, Agent, or Firm* — Pabrita K. Chakrabarti

(57) ABSTRACT

A temperature measurement system includes at least one filament configured to emit thermal radiation in a relatively broad and substantially continuous wavelength band that is at least partially representative of a temperature of the at least one filament. The system also includes an optical system configured to receive at least a portion of the thermal radiation emitted from the filament. The optical system includes a wavelength splitting device configured to split the emitted thermal radiation into at least one relatively narrow wavelength band of thermal radiation. The optical system also includes a detector array configured to receive the at least one relatively narrow wavelength band of thermal radiation and to generate electrical signals at least partially representative of the received thermal radiation. The temperature measurement system further includes a controller communicatively coupled to the detector array. The controller is configured to transform the generated electrical signals to a temperature indication using a predetermined conversion module.

15 Claims, 11 Drawing Sheets

(51) Int. Cl.
*G01K 3/00* (2006.01)
*F01D 17/08* (2006.01)
*F02C 9/28* (2006.01)
*G01J 5/08* (2006.01)
*G01J 5/60* (2006.01)
*G01J 5/10* (2006.01)

(52) U.S. Cl.
CPC ......... *F05D 2270/303* (2013.01); *G01J 5/0862* (2013.01); *G01J 2005/106* (2013.01)

(56) References Cited

U.S. PATENT DOCUMENTS

| | | | | |
|---|---|---|---|---|
| 5,696,863 | A * | 12/1997 | Kleinerman | 385/123 |
| 2009/0285259 | A1 * | 11/2009 | Allen et al. | 374/130 |
| 2011/0128989 | A1 * | 6/2011 | Li et al. | 374/131 |
| 2011/0240858 | A1 * | 10/2011 | Estevadeordal et al. | 250/338.3 |
| 2015/0049786 | A1 * | 2/2015 | Wang et al. | 374/138 |

OTHER PUBLICATIONS

Peter B. Kuhn, et al., Soot and Thin-Filament Pyrometry Using a Color Digital Camera, Proceedings of the Combustion Institute, pp. 743-750, 2011, vol. 33, Science Direct, Elsevier.

Jun Ji, et al., Emission Spectroscopy Based Temperature Sensor for On-Line Non-Intrusive Gas Turbine Inlet Temperature Measurement, Proceedings of JPGC'01, 2001 International Joint Power Generation Conference, 10 pages, 2001, ASME.

Tzong H. Chen, et al., Conditional Velocity Measurements at the Base of Turbulent, Lifted Jet Flames, Systems Research Laboratories, Inc., 7 pages, 1990, AIAA/SAE/ASME/ASEE.

* cited by examiner

LINE PATTERN

SCANNING WIRE

GRID PATTERN

INSIDE BL

METHOD AND SYSTEM FOR GAS TEMPERATURE MEASUREMENT

BACKGROUND

The field of the disclosure relates generally to gas temperature measurement, and more specifically, to methods and a system for measuring gas temperature in harsh environments based on radiation thermometry using thin filaments.

Measuring gas temperatures in a combusting flame or harsh environment downstream of a combustor may include many sources of inaccuracy and non-repeatability. Many of those relate to physical properties of the detector itself. For example, to survive the environment many temperature probes are sheathed in metal tubes, which partially isolates the detector from the environment desired to be measured. Such isolation may reduce a temporal response of the detector. Moreover, a massive protective sheath may also affect a spatial resolution of the detector, e.g., temperature gradients forming through the sheath from the relatively hotter environment toward the relatively cooler environment of the detector. Furthermore, such massive protective sheath may also affect the flow field being measured, e.g., the gas temperature measurements are different between conditions with and without the probe. Such an intrusive configuration may not be acceptable for many practical applications requiring precise and accurate gas temperature measurements.

In addition to the hot gas path of a gas turbine engine, it is difficult to measure temperature profiles accurately in other gas turbine engine areas as well. For example, areas of the compressor gas path experience a reduced temporal response of the detector due to the sheath used to protect the detector, but also because the temperature is lower in those areas of the compressor as compared to areas of the hot gas path. The lower temperature contributes to a reduced response time of the detector. Further, areas of fluid flow other than a gas turbine engine gas path are also difficult to measure accurately using known temperature measurement systems. For example, temperatures in or near a surface flow stream are difficult to measure due to flow streams changing positions for differing flow conditions. Therefore it is desirable to have a temperature measurement system having a detector that can produce temperature profiles or maps in two and three dimensions and be able to self-adjust its position to accommodate variations in a measured flow stream.

BRIEF DESCRIPTION

In one embodiment, a temperature measurement system is provided. A temperature measurement system includes at least one filament configured to emit thermal radiation in a relatively broad and substantially continuous wavelength band that is at least partially representative of a temperature of the at least one filament. The system also includes an optical system configured to receive at least a portion of the thermal radiation emitted from the filament. The optical system includes a wavelength splitting device configured to split the emitted thermal radiation into at least one relatively narrow wavelength band of thermal radiation. The optical system also includes a detector array configured to receive the at least one relatively narrow wavelength band of thermal radiation and to generate electrical signals at least partially representative of the received thermal radiation. The temperature measurement system further includes a controller communicatively coupled to the detector array. The controller is configured to transform the generated electrical signals to a temperature indication using a predetermined conversion module.

In another embodiment, a method of temperature measurement is provided. The method includes positioning at least one filament in a flow path of a fluid and positioning an optical system proximate the at least one filament. The method also includes receiving at least a portion of thermal radiation emitted by the at least one filament in the optical system. The received thermal radiation is in a relatively broad and substantially continuous wavelength band. The emitted thermal radiation is at least partially representative of a temperature of the at least one filament. The method also includes splitting the received thermal radiation into at least one relatively narrow wavelength band of thermal radiation. At least one of the wavelength and the amplitude of the emitted thermal radiation is at least partially representative of a temperature of the at least one filament. The method further includes generating electrical signals at least partially representative of the received thermal radiation. The method also includes converting the generated electrical signals to a temperature indication. The method further includes outputting the temperature indication to at least one of an indicator and a processor.

In yet another embodiment, a gas turbine engine system is provided. The gas turbine engine system includes a combustion chamber configured to generate a flow of relatively hot combustion products and a turbine downstream in serial flow communication with the combustion chamber. The combustion chamber and the turbine at least partially define at least a portion of a gas path configured to channel the flow of relatively hot combustion products. The gas turbine system also includes a temperature measurement system positioned at least partially in the gas path. The temperature measurement system includes at least one filament configured to emit thermal radiation in a relatively broad and substantially continuous wavelength band at least partially representative of a temperature of the at least one filament. The temperature measurement system also includes an optical system configured to receive at least a portion of the thermal radiation emitted from the at least one filament. The optical system includes at least one optical component at least partially transparent to the relatively broad and substantially continuous wavelength band of thermal radiation. The optical component is positioned between the gas path and an area of relatively lower temperature. The optical system also includes a wavelength splitting device configured to split the emitted thermal radiation into at least one relatively narrow wavelength band of thermal radiation. The optical system further includes a detector array configured to receive the at least one relatively narrow wavelength band of thermal radiation and to generate electrical signals at least partially representative of the received thermal radiation. The temperature measurement system further includes a controller communicatively coupled to the detector array. The controller is configured to transform the generated electrical signals to a temperature indication using a predetermined conversion module.

DRAWINGS

FIG. 1 is a schematic block diagram of a gas temperature measurement system in accordance with an exemplary embodiment of the present system as applied to an inlet of a turbine.

FIG. 2 is a side cross-sectional view of a portion of gas turbine engine system in accordance with the present system.

FIG. 3 is a graph of the available absorption/emission free wavelength bands that can be used for the temperature map measurements.

FIGS. 4A, 4B, 4C, and 4D illustrate configurations of filament placement that are used to achieve multiple spatial line temperature distributions in accordance with an exemplary embodiment of the present system.

Figure 5:
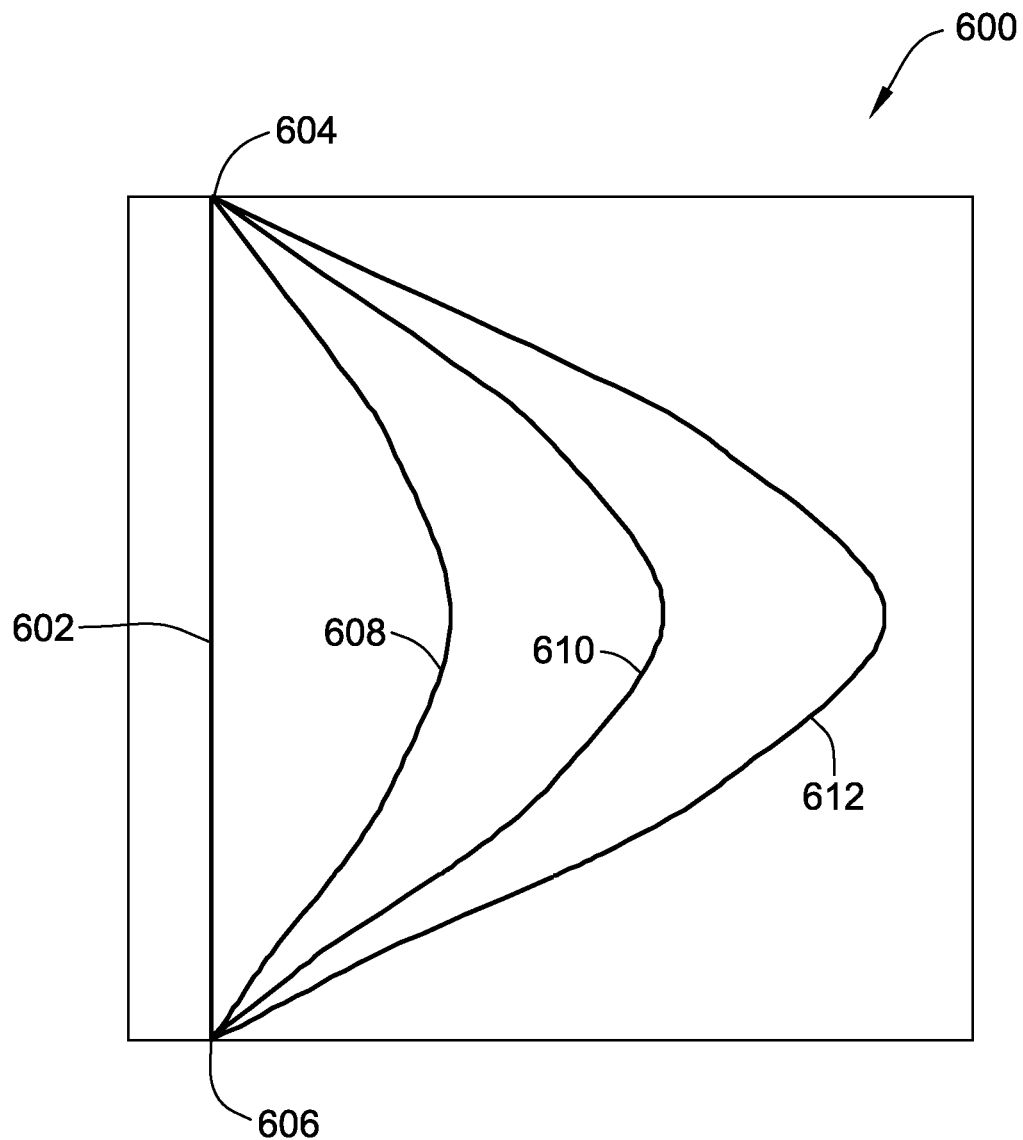

FIG. 5 is an illustration of a plurality of filament configurations for monitoring a 2D temperature field.

Figure 6:
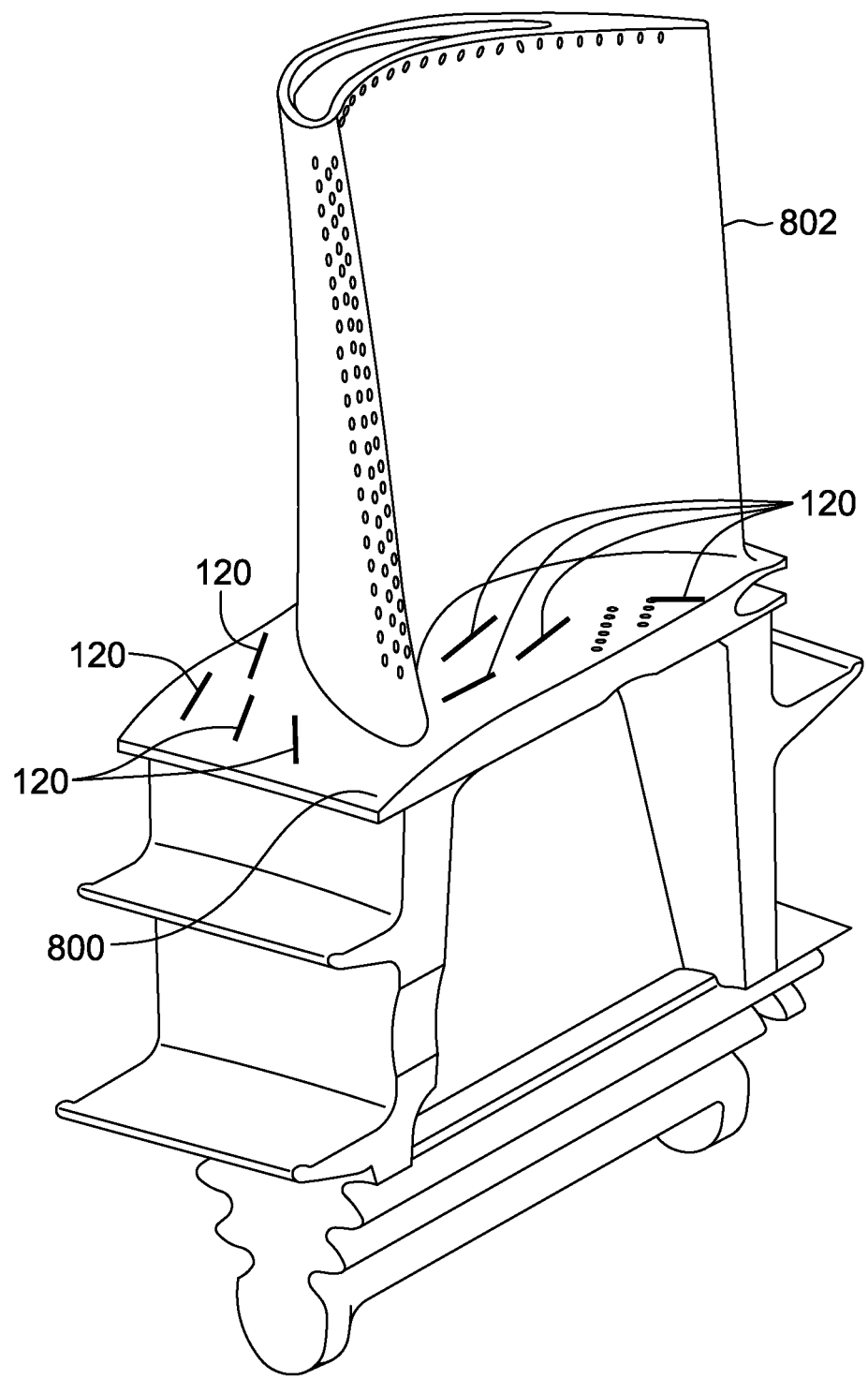

FIG. 6 is a perspective view of a plurality of filaments 120 mounted on a surface of a turbine component.

Figure 7:
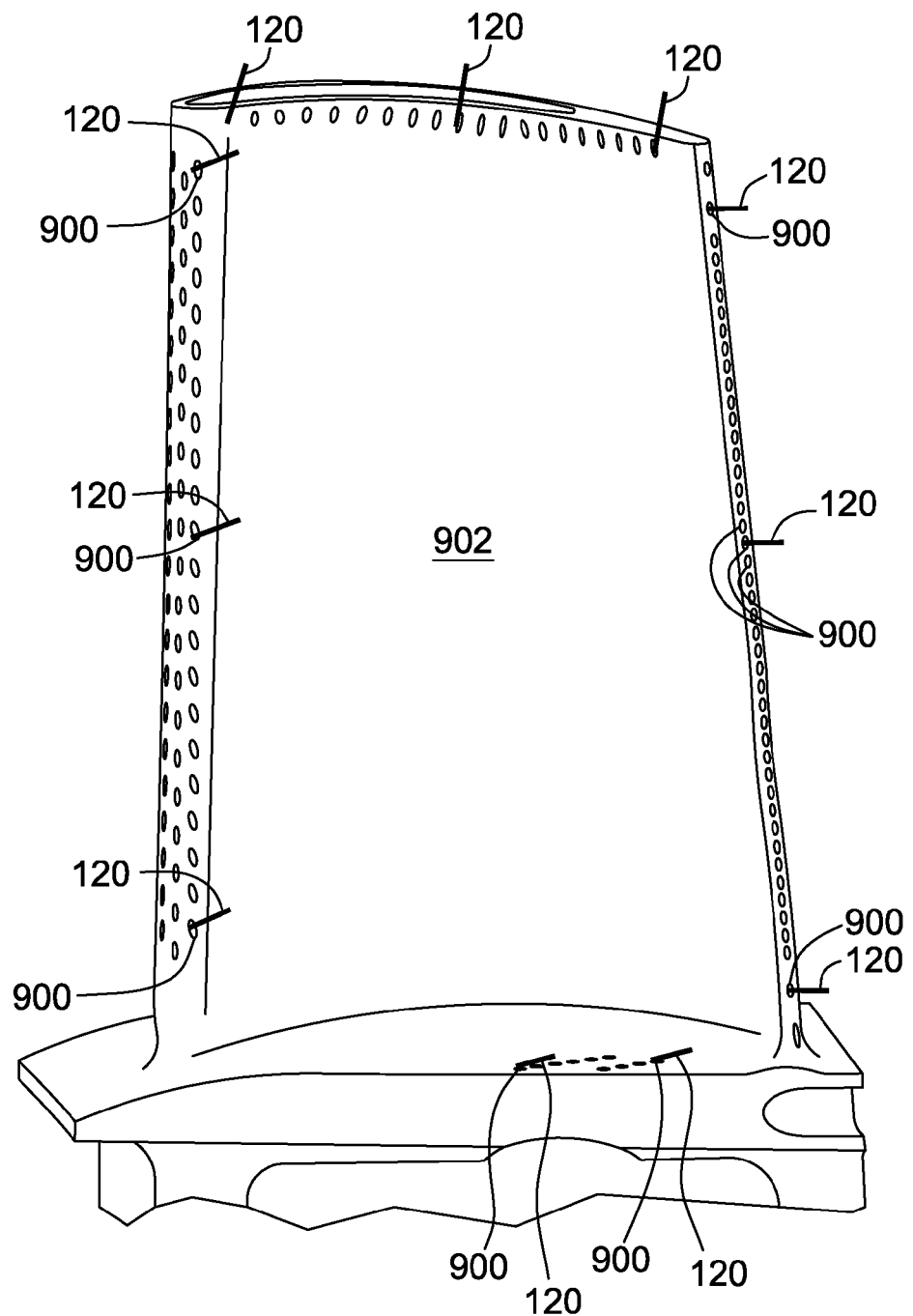

FIG. 7 is a perspective view of a plurality of filaments mounted to extend out of film cooling holes of a turbine component.

Figure 8:
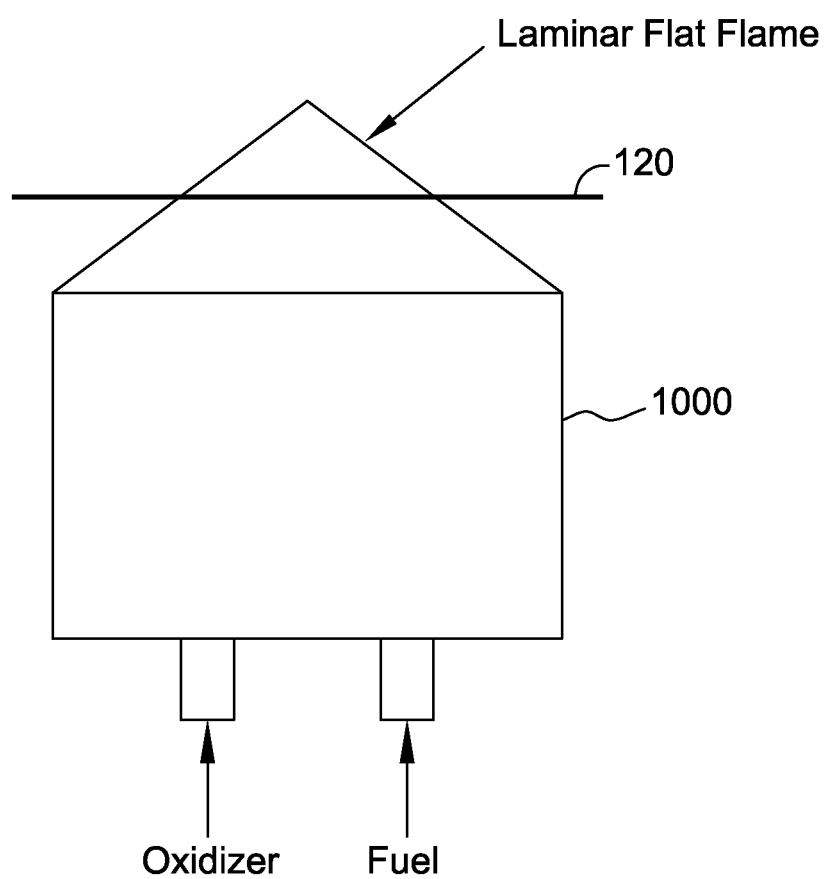

FIG. 8 is a front view of a laminar flat flame burner used to generate an accurate temperature reference flame at the temperature range of interest for calibration.

Figure 9:
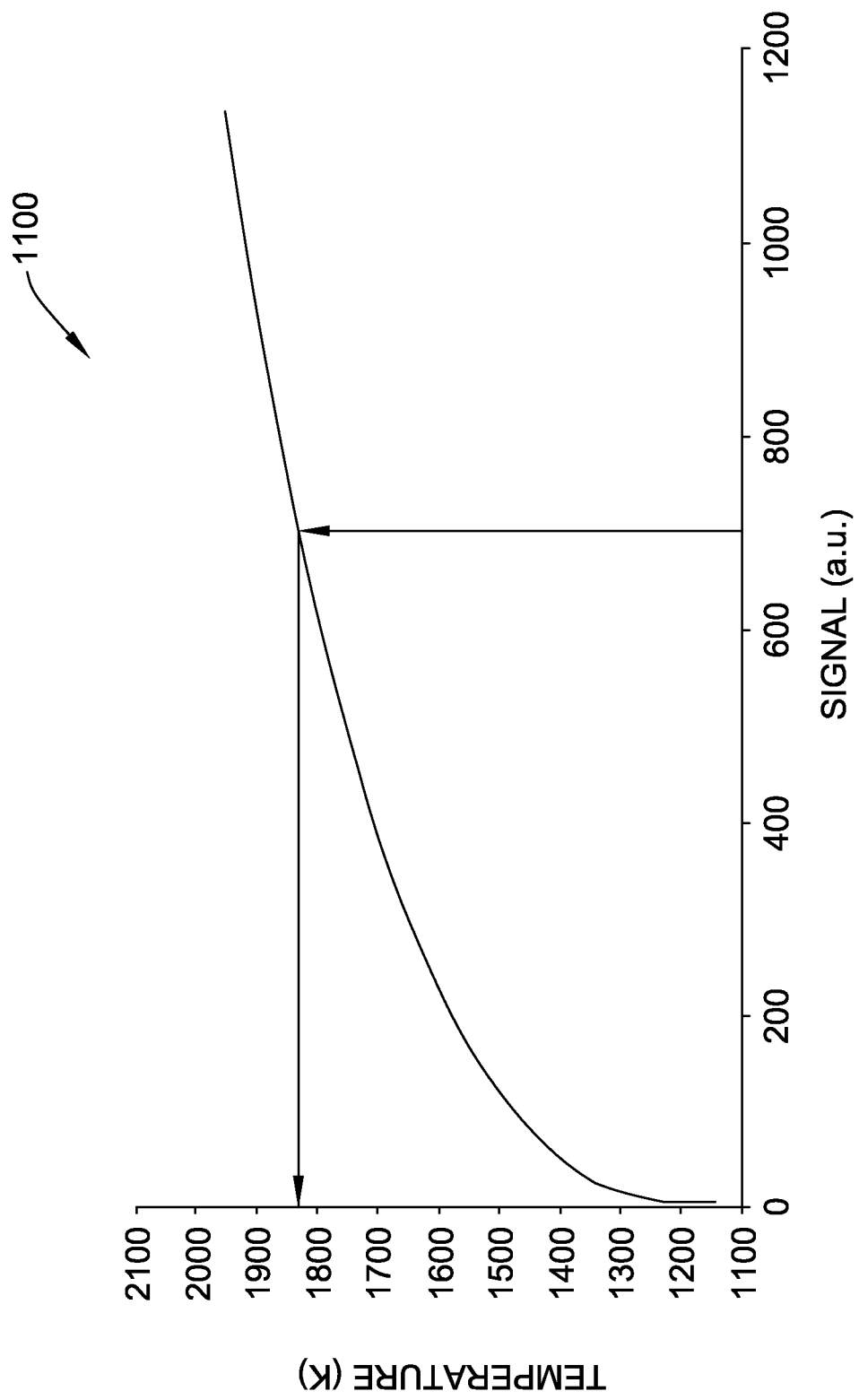

FIG. 9 is a graph showing an exemplary calibration curve to convert the sensor signal to a temperature of filament.

Figure 10:
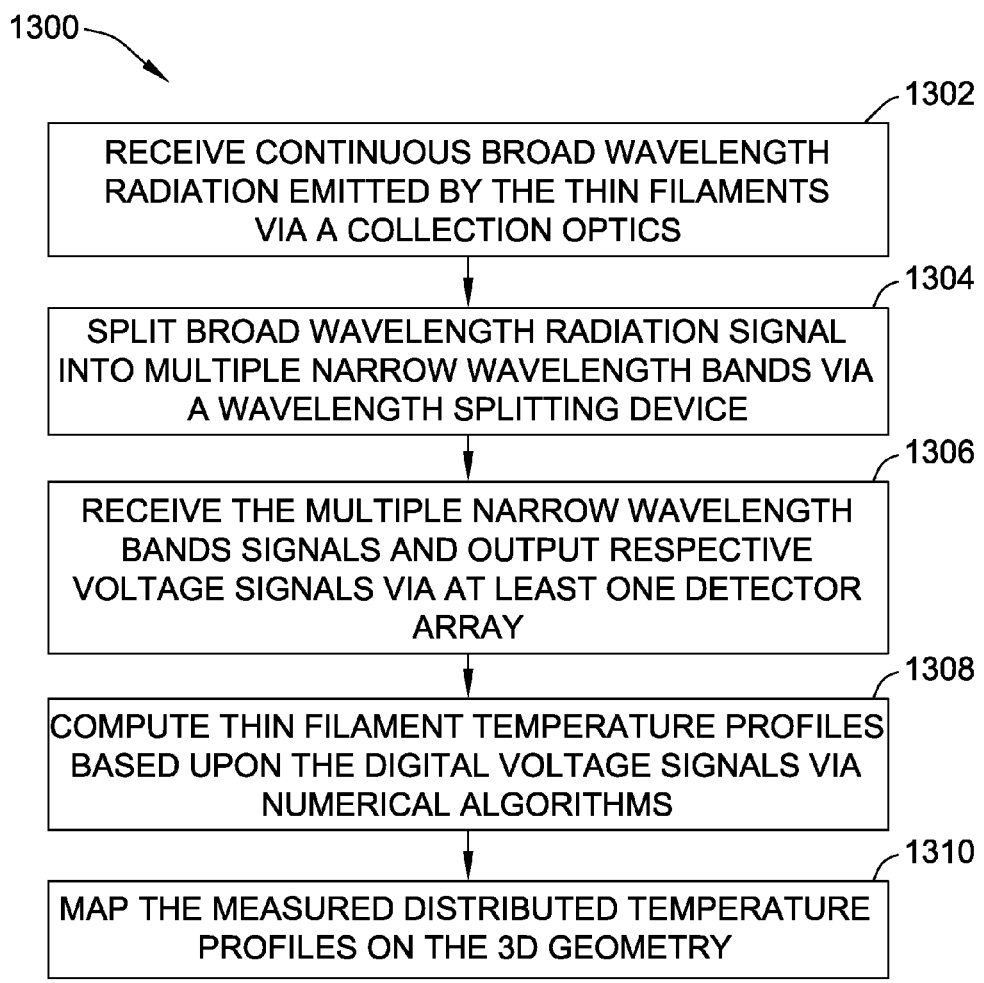

FIG. 10 is a flow chart for a method generating a three-dimensional (3D) map of temperature in a volume of interest.

Figure 11:
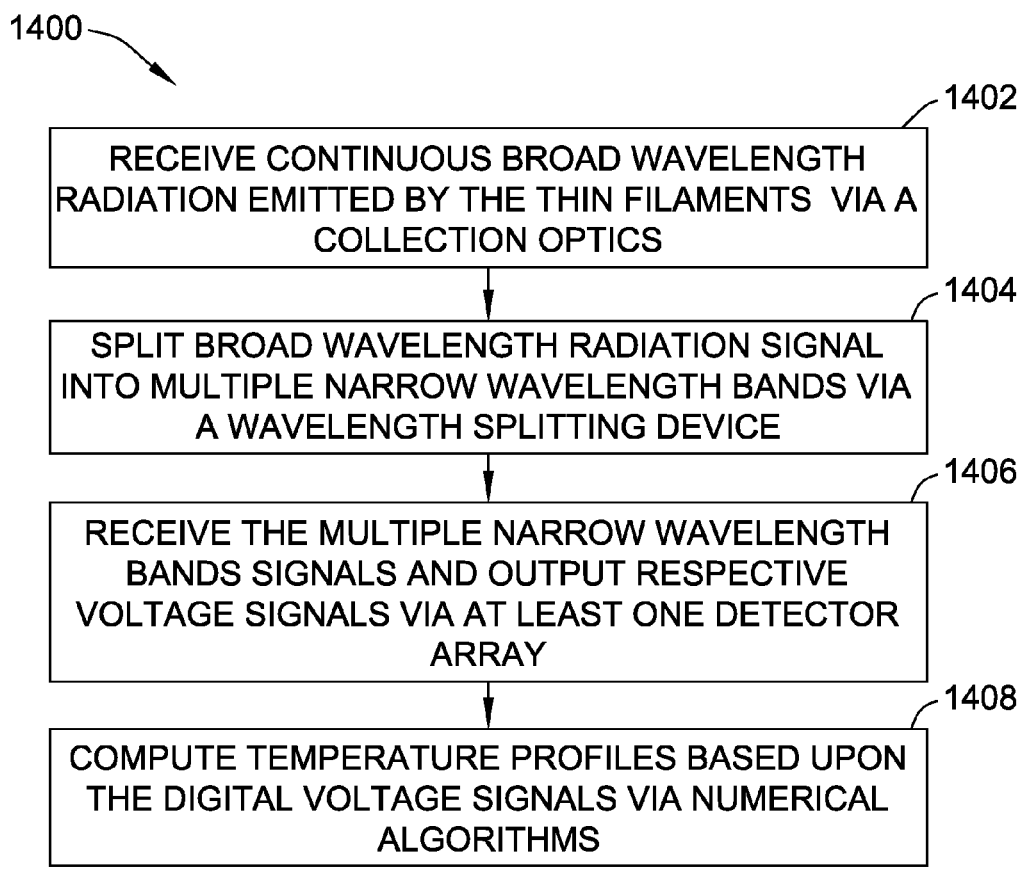

FIG. 11 is the flow chart for a method measuring a temperature of an area of interest.

DETAILED DESCRIPTION

The following detailed description illustrates embodiments of the invention by way of example and not by way of limitation. It is contemplated that the embodiments of the invention has general application to analytical and methodical embodiments of temperature measurement in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Gas temperature measurement based on radiation thermometry using thin filaments, is a relatively new temperature measurement technology and has been applied to measure gas temperatures in hot or reacting flows in the range of approximately 550° K to approximately 2200° K with an uncertainty of approximately 50° K, a precision of approximately 1° K, a spatial resolution of approximately 50 microns, and temporal resolution of approximately 50 microsec. The thin-filament is typically in the range of 10-200 microns in diameter. Thin filaments may be formed of various materials, for example, silicon-carbide (SiC), which may be selected for its good mechanical strength, modulus and fatigue strength under high temperature and pressure harsh environments, relatively constant emissivity, resistance to oxidation and catalytic effects, and wide availability. Other materials can also be used as the thin-filaments, for example, but not limited to sapphire, fused silica, tungsten, and graphite. When used for gas temperature measurements, the filament is placed in the hot gas flows and the sensor detects thermal radiation emissions from the filament. A temperature of the filament is calculated from the calibration curve and the gas temperature is then inferred through the energy balance between the filament, gas flow and surrounding environment. To measure gas temperature inside running gas turbines, the filament is placed in the hot gas flows, e.g. combustor, stage one nozzle (S1N), and stage one blade (S1B). Emissions from the filament are collected through view ports or windows on the gas turbine casing. A sensor detects the emissions and transforms them into digital signals. Filament temperature is calculated from the calibration curve.

By mounting the thin filaments in different parts of the hot-gas path (HGP) flow fields, using a thin filament grid, flying thin filaments, scanning single filament or grid, and tufts, the gas temperature distribution can be obtained in two or three dimensions.

Theoretical predictions for temperature corrections due to thermal radiation, spatial resolutions, and temporal resolutions for the gas temperature measurement technique may be given by:

| Quantity | | Definitions | Proportional |
|---|---|---|---|
| $\tau$ | Time response | $\dfrac{\rho_f c_f d_f}{4h_g}$ | $\tau \propto d_f^2$ |
| $\delta$ | Spatial resolution | $\sqrt{\dfrac{k_f d_f}{4h_g}}$ | $\delta \propto d_f$ |
| $\Delta T$ | Temperature correction | $\dfrac{\epsilon_f \sigma}{h_g}(T_f^4 - T_\infty^4)$ | $\Delta T \propto d_f$ | where
Symbols

| | | |
|---|---|---|
| $c_f$ | J/(kgK) | specific heat of filament |
| $d_f$ | m | Diameter of filament |
| $h_g$ | W/(m²K) | Heat transfer coefficient of gas |
| $k_f$ | W/(mK) | Thermal conductivity of filament |
| $T_f$ | K | Temperature of filament |
| $T_g$ | K | Temperature of gas |
| $T_\infty$ | K | Temperature of surrounding environment |
| $\Delta T$ | K | Temperature correction [$\Delta T = T_g - T_f$] |
| $\epsilon_f$ | | Emissivity of filament |
| $\rho_f$ | kg/m³ | Density of filament |
| $\sigma$ | W/(K⁻⁴m²) | Stefan-Boltzmann constant, 5.6704 × 10⁻⁸ |

Figure 1:
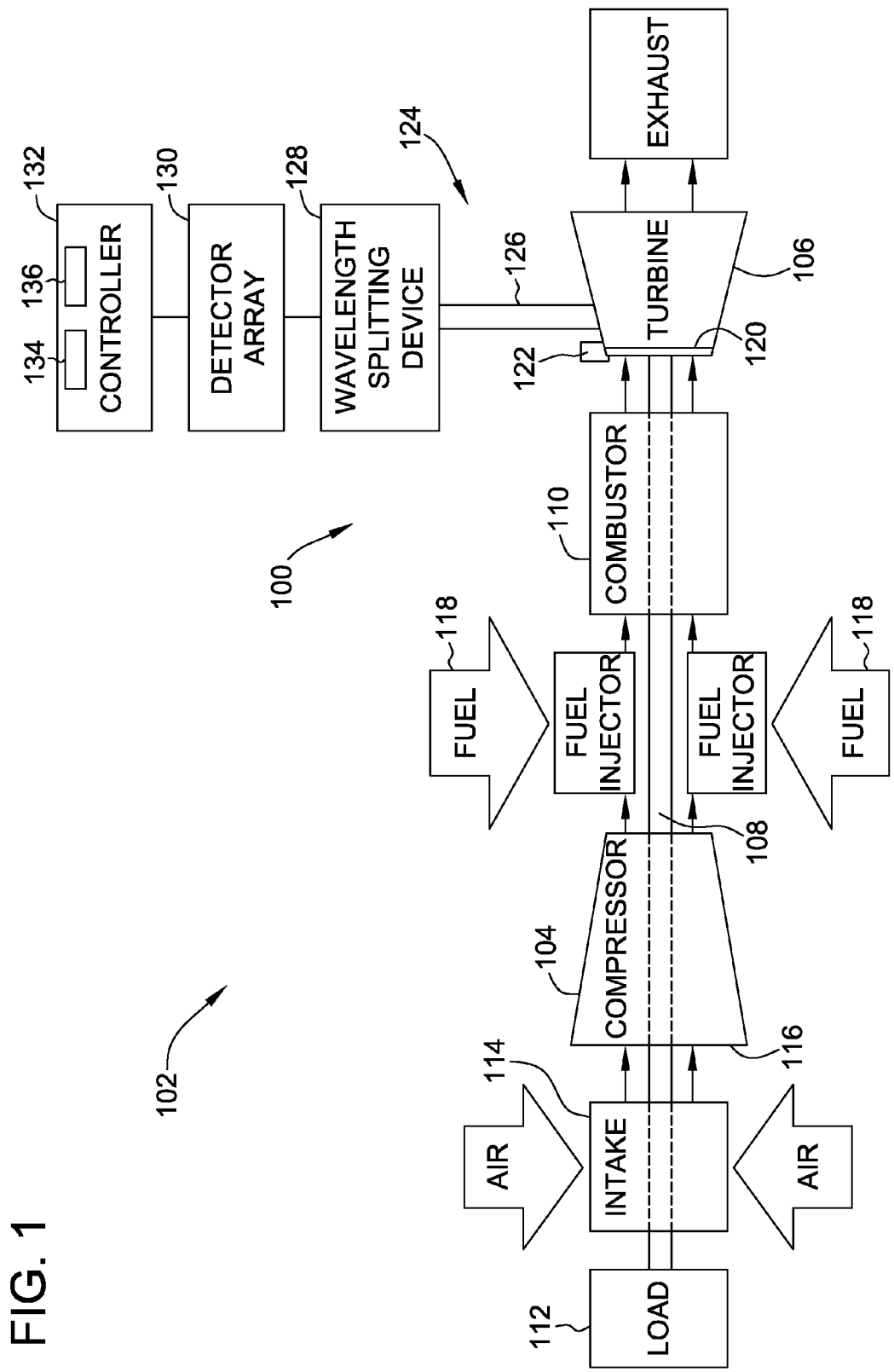
FIGS. 1-11 show exemplary embodiments of the method and system described herein.

FIG. 1 is a schematic block diagram of a gas temperature measurement system 100 in accordance with an exemplary embodiment of the present system. In the exemplary embodiment, system 100 is implemented in association with a gas turbine engine system 102. However, system 100 as described herein in other embodiments may used with, for example, but not limited to, boilers, other turbo-machinery, refining plants, and solar collectors. In the exemplary embodiment, gas turbine engine system 102 includes a compressor 104 and turbine 106 mounted on a common shaft 108 and coupled in a serial flow arrangement with a combustor 110 positioned between them. A load 112, such as, but not limited to, a generator, a pump, and a compressor is also drivingly coupled to shaft 108.

During operation, air or other oxygen containing working fluid is received at intake 114 and directed to an inlet 116 of compressor 104, compressed air is then directed to combustor 110, where fuel 118 is added to the flow of compressed air and ignited, generating a flow of relatively hot, high-energy gases. The gases are directed through turbine 106, where work is extracted to drive compressor 104 and load 112.

While gas turbine engine system 102 is in operation, gas temperature measurement system 100 monitors one or more temperatures of the gases passing through gas turbine engine system 102. Gas temperature measurement system 100 includes one or more filaments 120 positioned within a flow path of the hot high-energy gases generated in combustor 110. In various embodiments, filaments 120 may be positioned at for example, but not limited to, an inlet to combustor 110, an outlet from combustor 110, an inlet to turbine 106, and an outlet from turbine 106. Filaments 120 may also be coupled to various components operating in the gas path of gas turbine engine system 102, such as, but not limited to, blades, vanes, cooling apertures, and stationary surfaces, e.g., nozzles, and rotatable surfaces, e.g., buckets and blades, and turbine exhausts. In the exemplary embodiment, filaments 120 are approximately 4.0 millimeters (mm) or less in diameter, e.g., without limitation, in the range between approximately 10 microns and 200 microns in diameter. Alternatively, filaments 120 have any dimensions that enable operation of gas temperature monitoring system 100 as described herein.

In various embodiments, gas temperature measurement system 100 also includes a filament controller 122 communicatively coupled to an optical system 124. Filament controller 122 is configured to control a position and/or tension of filaments 120. In various embodiments, filaments 120 may be translated across the gas path using a scanning mechanism portion (not shown separately) of filament controller 122 to obtain two-dimensional (2D) temperature profile information in the gas path or a tension of filaments 120 may be reduced to allow slack in filaments 120. Such slack may permit filaments 120 to be exposed to a 2D area of the flow through the gas path permitting 2D determination of a temperature profile in the gas path. In other embodiments, filament controller 122 is not used, for example, in an application where filaments 120 are fixed in position and at a constant tension.

In the exemplary embodiment, optical system 124 includes sufficient collection optics, i.e., optical system 124 includes an optical component 126 fabricated of a material that is at least partially transparent to thermal radiation emitted by filaments 120 to collect the thermal radiation light from thin filaments 120. Optical component 126 is any device that enables operation of optical system 124 and gas temperature measurement system 100, including, without limitation, windows, lens, and mirrors. Optical system 124 also includes a wavelength splitting device 128 that is configured to split broad wavelength band thermal radiation signals into a plurality of relatively narrow band thermal radiation signals. Optical system 124 further includes at least one detector array 130 that is configured to convert the relatively narrow band thermal radiation signals to digital signals.

Also, in the exemplary embodiment, gas temperature measurement system 100 includes a controller 132 that includes a processor 134 and a memory 136. Memory 136 includes one or more predetermined algorithms configured, when executed by processor 134 to convert the digital signals into temperature indication based on a predetermined calibration curve.

Controller 132 is programmed with sufficient instructions and algorithms to enable operation of gas temperature measurement system 100 as described herein. In general, multi-color pyrometry (MCP) algorithms are used to determine the gas temperature. In the exemplary embodiment, at least one of a linear least-squares multi-color pyrometry (LSMCP) method and a non-linear MCP method is used to determine temperatures. Alternatively, any other methods, including, without limitation, ratio-metric MCP, that enable operation of gas temperature measurement system 100 may be used.

The LSMCP and non-linear MCP methods use Wien's law as derived from Planck's law to define a plurality of matrices (described below). Wien's law states:

$$-\frac{1}{T_R} = -\frac{1}{T} + \frac{\lambda}{C_2}\ln[\varepsilon(\lambda)], \qquad \text{Eq. (1)}$$

where $T_R$ represents the radiance temperature of an object being monitored, in units of degrees Kelvin (° K), that is determined from the radiative intensity assuming a blackbody, i.e., an emissivity ($\epsilon$) value of unity (1), T represents the filament temperature to be determined in units of ° K, $\lambda$ represents the wavelength of the emitted thermal radiation from the object in units of nanometers (nm), and $C_2$ is the second radiation constant of $1.4388*10^{-2}$ in units of meters-° K (m° K), and $\epsilon(\lambda)$ represents the unitless emissivity of the object as a function of the emitted thermal radiation wavelength. With determined values for $\lambda$, $\epsilon(\lambda)$, and $T_R$, a temperature of the filament may be determined by using intensities measured a predetermined wavelengths in equation (1) above within controller 132.

The logarithmic function of emissivity as a function of wavelength, i.e., ln [$\epsilon(\lambda)$], in equation (1) above, for thin filaments, as described herein, often exhibits a polynomial dependence on the wavelength $\lambda$. Therefore, a polynomial expression with an "M−2" order may be used to facilitate fitting the emissivity $\epsilon(\lambda)$ in equation (1) as:

$$\ln[\varepsilon(\lambda)] = C_2 \sum_{i=1}^{M-1} a_i \lambda^{i-1}. \qquad \text{Eq. (2)}$$

For N-color pyrometry, equation 2 may be expressed as:

$$Y = A*X, \qquad \text{Eq. (3)}$$

where Y is a known vector of size N*1 and X is an unknown vector of size M*1 which may be expressed as:

$$Y = \begin{bmatrix} y_1 \\ y_2 \\ y_3 \\ \vdots \\ y_N \end{bmatrix}, \text{ and } X = \begin{bmatrix} a_0 \\ a_1 \\ a_2 \\ \vdots \\ a_{M-1} \end{bmatrix},$$

where A is a coefficient matrix of the size N*M that may be expressed as:

$$A = \begin{bmatrix} 1 & \lambda_1 & \lambda_1^2 & \cdots & \lambda_1^{M-1} \\ 1 & \lambda_2 & \lambda_2^2 & \cdots & \lambda_2^{M-1} \\ 1 & \lambda_3 & \lambda_3^2 & \cdots & \lambda_3^{M-1} \\ \vdots & \vdots & \vdots & & \vdots \\ 1 & \lambda_N & \lambda_N^2 & \cdots & \lambda_N^{M-1} \end{bmatrix},$$

where $y_j = -1/(T_R)_j$ at wavelength $\lambda_j$, and where j=1, 2, ..., N, and $a_0 = -1/T$.

Solving equation 3, above, using the above matrices, for temperature T and emissivity $\epsilon(\lambda)$ generates the solution:

$$\begin{cases} T = -1/a_0 \\ \varepsilon(\lambda_j) = \exp\left(C_2 \sum_{i=1}^{M-1} a_i \lambda_j^{i-1}\right) \text{ where } j = 1, 2, \ldots, N. \end{cases} \quad \text{Eq. (4)}$$

In the event that the number of unknowns is less than the number of wavelengths, equation (3) is an over-determined system. Under such circumstances, the LSMCP method is used to determine temperature and emissivity in a closed-form solution. Here, a solution X is determined which facilitates minimizing the associated Euclidean norm ‖Y−AX‖, i.e., $L^2$ norm. The solution X is unique since the detection wavelength bands are different. The solution X is determined by solving the normal equations represented by:

$$A^T * Y = (A^T * A) * X, \quad \text{Eq. (5)}$$

where matrix $A^T$ is the transpose of the matrix A.

In some embodiments, the values for emissivity are held constant, based on, for example, and without limitation, empirical data. For those situations where emissivity is held constant using a LSMCP method, equation (2) is simplified to:

$$\ln[\varepsilon(\lambda)] = C_2 a_1, \quad \text{Eq. (6)}$$

and the solution for temperature and emissivity is:

$$\begin{cases} T = -1/a_0 \\ \varepsilon(\lambda_i) = \exp(C_2 a_1), \text{ where } i = 1, 2, \ldots, N. \end{cases} \quad \text{Eq. (7)}$$

In some embodiments, the values for emissivity are linear, based on, for example, and without limitation, empirical data. For those situations where emissivity is linear using a LSMCP method, equation (2) is simplified to:

$$\ln[\varepsilon(\lambda)] = C_2(a_1 + a_2\lambda_i), \text{ where } i = 1, 2, \ldots, N, \quad \text{Eq. (8)}$$

and the solution for temperature and emissivity is:

$$\begin{cases} T = -1/a_0 \\ \varepsilon(\lambda_i) = \exp(C_2(a_1 + a_2\lambda_i), \text{ where } i = 1, 2, \ldots, N. \end{cases} \quad \text{Eq. (9)}$$

Alternatively, the non-linear MCP method may be used to generate solutions through an iterative method. Use of the algorithms described above facilitates increasing the accuracy of temperature measurements by reducing the effects of contamination on optical component 126 that may affect transmission, and measuring emissivity to decrease the effects of variable emissivity on temperature measurements.

Figure 2:
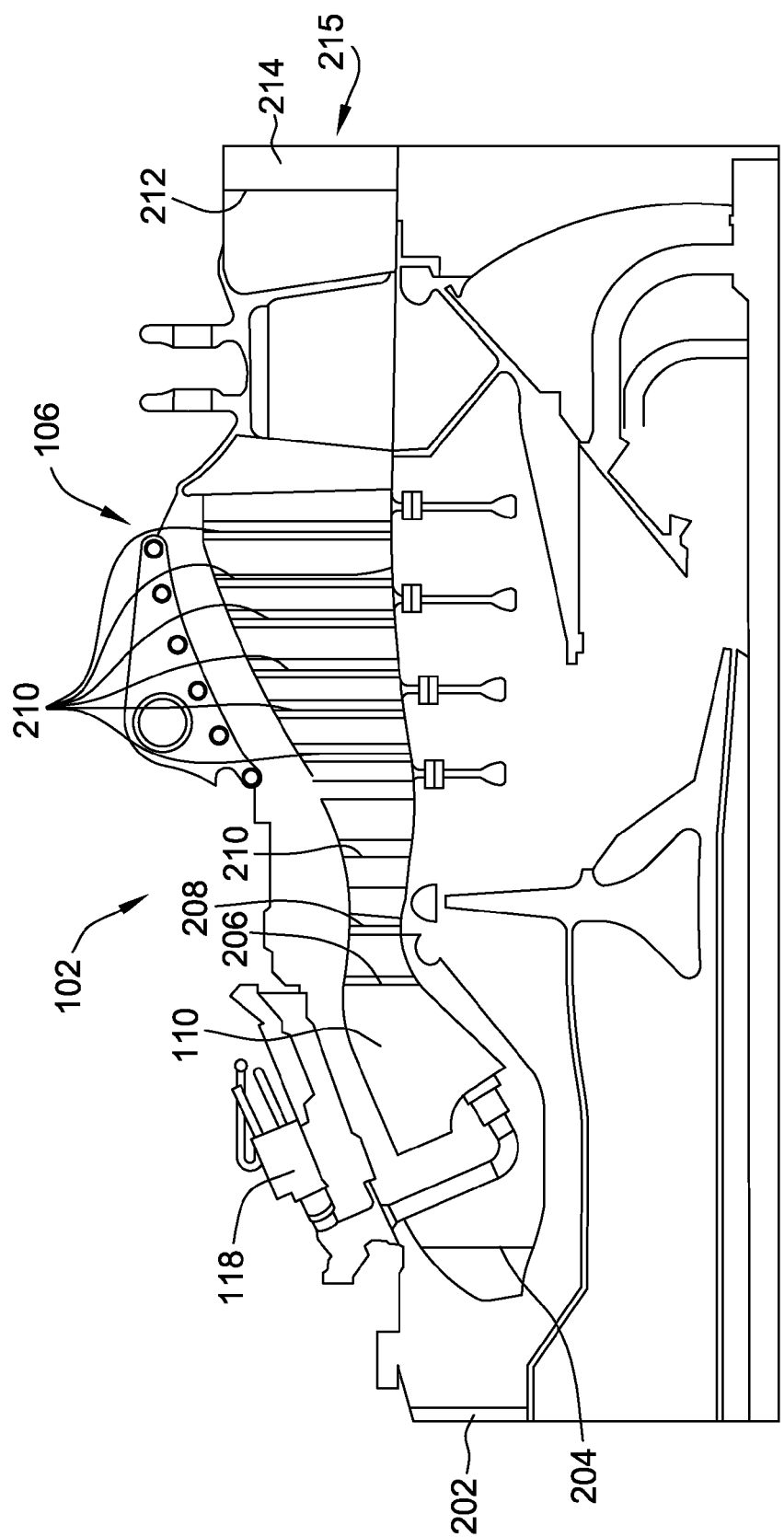

FIG. 2 is a side cross-sectional view of a portion of gas turbine engine system 102 in accordance with an exemplary embodiment of the present system. In the exemplary embodiment, FIG. 2 illustrates using gas temperature measurement system 100 to measure gas temperature at a compressor outlet 202, a combustor inlet 204, a combustor exit 206, an S1N location 208, and at inter-stages 210 of turbine 106, and inside or at the exit 212 of one or more nozzles 214 and exhaust 215. It should be noted that GAS temperature measurement system 100 can be used to measure gas temperature on other positions of gas turbine engine system 102 not shown in FIG. 2, for example, but not limited to, compressor 104, and secondary flows in gas turbine engine system 102.

Figure 3:
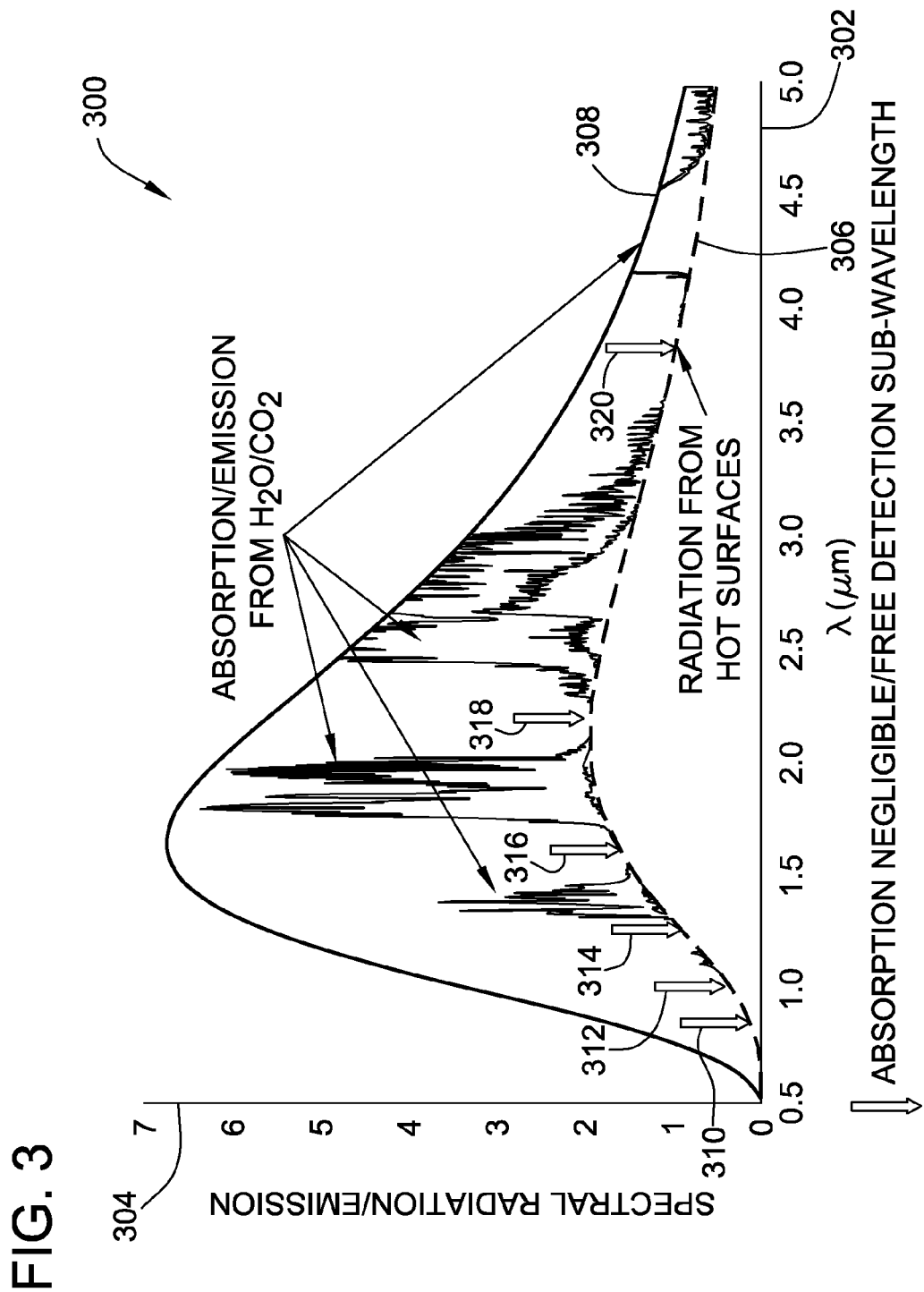

FIG. 3 is a graph 300 of the available absorption/emission free wavelength bands that can be used for the temperature profile measurements. In the exemplary embodiment, graph 300 includes an x-axis 302 graduated in units of wavelength expressed in μm. Graph 300 includes a y-axis 304 graduated in units of spectral radiation/emission. A first trace 306 indicates an amount of thermal radiation to be expected from hot surfaces within the gas path. A second trace 308 indicates a maximum thermal radiation expected from absorption/emission from water ($H_2O$) and carbon dioxide ($CO_2$) passing through the gas path.

The thermal radiation emitted from filaments 120 (shown in FIG. 1) is at least partially representative of the temperature of the filaments. Such radiative emissions are typically contained in a broad band of wavelengths that can be divided into expected, relatively narrower detection wavelength bands. For example, and without limitation, the relatively narrow wavelength bands of thermal radiation include at least one of a first wavelength band extending at least partially between approximately 400 nanometers (nm) and approximately 1300 nm, a second wavelength band extending at least partially between approximately 1500 nm and approximately 1800 nm, a third wavelength band extending at least partially between approximately 2000 nm and approximately 2500 nm, and a fourth wavelength band extending at least partially between approximately 2500 nm and approximately 4200 nm. Alternatively, any wavelength band, or portion thereof, may be used that enables operation of gas temperature measurement system 100 as described herein. Also, alternatively, any other measurements of the received thermal radiation that facilitate temperature determinations are used to enable operation of gas temperature measurement system 100 as described herein, including, without limitation, an amplitude determination.

Figure 4A:
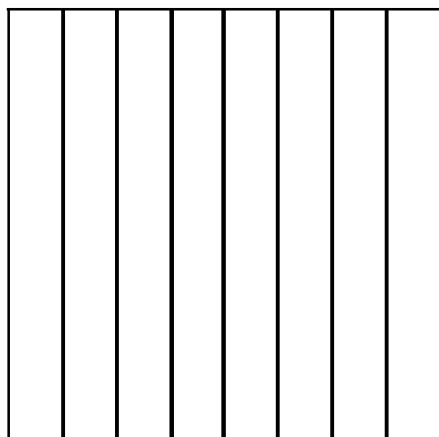
Figure 4B:
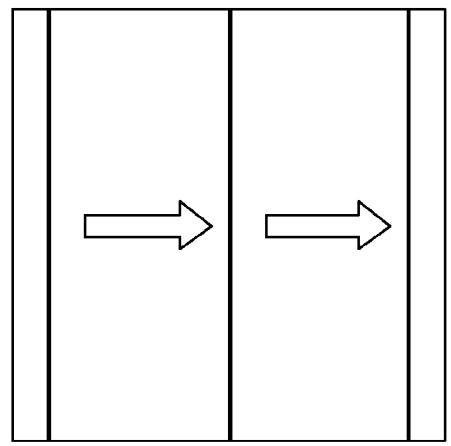
Figure 4C:
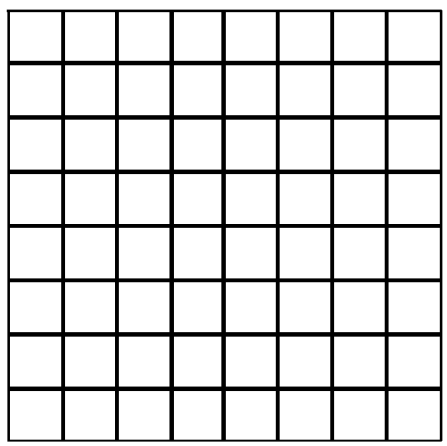
Figure 4D:
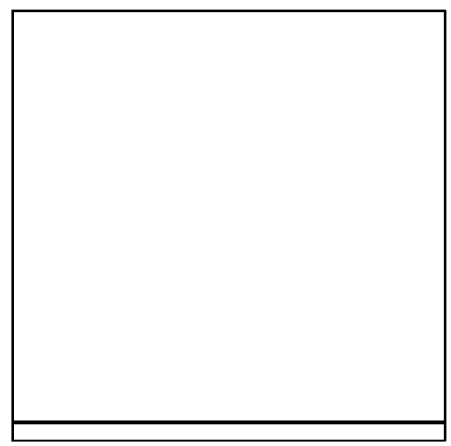

FIGS. 4A, 4B, 4C, and 4D illustrate configurations of filament placement that are used to achieve multiple spatial line temperature distributions in accordance with an exemplary embodiment of the present system. In the exemplary embodiment, FIG. 4A shows a configuration to determine measurements with a line pattern, FIG. 4B shows a configuration to determine measurements with a grid pattern, FIG. 4C shows a configuration for a field measurement by scanning the filament across the field, and FIG. 4D shows a filament inside boundary layer.

FIG. 5 is an illustration 600 of a plurality of filament configurations for monitoring a 2D temperature field. In the exemplary embodiment, filament 120 (shown in FIG. 1) is coupled at each end such that a tension along a length of filament 120 is controllable. At a first tension 602, filament 120 is taut and traverses a substantially straight path between an upper connection point 604 and a lower connection point 606. At a second tension 608, less than the first tension, filament 120 is not taut and traverses an arcuate path between upper connection point 604 and lower connection point 606. At a third tension 610, less than the second tension, filament 120 is not taut and traverses a more arcuate path between upper connection point 604 and lower connection point 606. At a fourth tension 612, less than the third tension, filament 120 is not taut and traverses an even more arcuate path between upper connection point 604 and lower connection point 606. Filament controller 122 (shown in FIG. 1) is controllable manually, through controller 132 (shown in FIG. 1), or through an internal algorithm to effect the changes in tension needed for each particular operating situation. The internal algorithm uses inputs of both tension and filament length available.

FIG. 6 is a perspective view of a plurality of filaments 120 (shown in FIG. 1) mounted on a surface 800 of a gas path component 802. In various embodiments, filaments 120 are attached using a mechanical holder (not shown) beneath surface 800 of component 802. In other embodiments, some of filaments are fixed to surface 800 using a holder (not shown) coupled to surface 800. Accordingly, such filaments 120 are fixed at both ends and are not free to align themselves with the cooling flow. In the exemplary embodiment, the component is a blade for a gas turbine engine. Gas temperature measurement system 100 (shown in FIG. 1) measures the thermal radiation signal from filaments 120 to infer a gas temperature on stream lines associated with component 802 during operation.

FIG. 7 is a perspective view of a plurality of filaments 120 (shown in FIG. 1) mounted to extend out of film cooling holes 900 of a blade 902. Filaments 120 follow the film cooling gas flow. Gas temperature measurement system 100 (shown in FIG. 1) measures the thermal radiation signal from short length filaments 120 to infer a gas temperature on stream lines associated with blade 902 during operation and measure the gas temperature distribution on the stream line. In various embodiments, filaments 120 are attached using mechanical holder within or adjacent film cooling holes 900 of a blade 902.

FIG. 8 is a side elevation view of a laminar flat flame burner 1000 used to generate an accurate temperature reference flame at the temperature range of interest for calibration of filaments 120 (shown in FIG. 1). In the exemplary embodiment, laminar flat flame burner 1000 has a substantially uniform temperature distribution and well characterized temperature accuracy. It should be noted that the calibration can also be performed with a black body with similar temperature range as the temperature range of interest.

FIG. 9 is a graph 1100 showing an exemplary calibration curve to convert the sensor signal to a temperature of filament 120 (shown in FIG. 1).

FIG. 10 is a flow chart for a method 1300 generating a three-dimensional (3D) map of temperature in a volume of interest. The gas system includes the thin filaments inside the operating gas turbine, the collection optics to collect the thermal radiation light from thin filament, the wavelength splitting device to split broad wavelength band signals into multi-narrow band signals, the at least one detector array convert thermal radiation signals into digital signals, the controller calculates the thin filament temperature profiles based on the digital signals. Method 1300 includes receiving 1302 continuous broad wavelength thermal radiation emitted by the thin filaments via optical system 124, splitting 1304 broad wavelength thermal radiation signal into multiple narrow wavelength bands via a wavelength splitting device, receiving 1306 the multiple narrow wavelength bands signals and output respective voltage signals via at least one detector array, computing 1308 thin filament temperature profiles based upon the digital voltage signals via numerical algorithms, and mapping 1310 the measured distributed temperature profiles on the 3D geometry.

FIG. 11 is the flow chart for a method 1400 measuring a temperature of an area of interest. Gas temperature measurement system 100 includes thin filaments mounted to a surface, collection optics to collect the thermal radiation light from thin filament, a wavelength splitting device to split broad wavelength band signals into multi-narrow band signals, at least one detector array to convert the thermal radiation signals into digital electrical signals, a controller configured to calculate temperature profiles based on the digital electrical signals. Method 1400 includes receiving 1402 continuous broad wavelength thermal radiation emitted by the thin filaments via a collection optics, splitting 1404 the broad wavelength thermal radiation signal into multiple narrow wavelength bands via a wavelength splitting device, receiving 1406 the multiple narrow wavelength bands signals and output respective voltage signals via at least one detector array, and computing 1408 temperature maps based upon the digital voltage signals via numerical algorithms.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 134, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is (a) positioning one or more silicon carbide filaments in a flow path of a fluid, (b) splitting a continuous broadband wavelength of thermal radiation emitted by the one or more filaments into a plurality of relatively narrow wavelength bands of thermal radiation, wherein a wavelength or amplitude of the emitted thermal radiation relates to a temperature of the filament, (c) receiving the emitted thermal radiation by a detector array, (d) generating electrical signals using the received thermal radiation, and (e) transforming the generated electrical signals to a temperature indication. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and system of measuring temperature using thin filament pyrometry provides a cost-effective and reliable means monitoring process parameters in heretofore difficult areas of components that experience harsh environmental conditions. More specifically, the methods and systems described herein facilitate measuring two and three dimensional temperature maps, stream lines, and cooling hole performance. In addition, the above-described methods and systems facilitate calibrating the temperature sensors and generating accurate temperature indications without using emissivity correction factors. As a result, the methods and systems described herein facilitate operating hot temperature components in a cost-effective and reliable manner.

This written description uses examples to disclose embodiments of the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A temperature measurement system comprising:
   at least one filament configured to emit thermal radiation in a broad and continuous wavelength band at least partially representative of a temperature of said at least one filament, wherein said at least one filament is configured to extend across a gas path;
   an optical system configured to receive at least a portion of the thermal radiation emitted from said at least one filament, said optical system comprising:
   a wavelength splitting device configured to split the emitted thermal radiation into at least one narrow wavelength band of thermal radiation; and
   a detector array configured to receive the at least one narrow wavelength band of thermal radiation and to generate electrical signals at least partially representative of the received thermal radiation; and
   a controller communicatively coupled to said detector array, said controller configured to transform the generated electrical signals to a temperature indication using a predetermined conversion module, said controller configured to generate a temperature profile across the gas path at least partially representative of the thermal radiation emitted by said at least one filament and further wherein said controller is configured to determine a temperature of said gas through an energy balance between said at least one filament, a flow of said gas and an environment surrounding said at least one filament.

2. The system in accordance with claim 1, wherein said at least one filament comprises a first end, a second end, and an elongate body extending therebetween, wherein said at least one filament is positioned in the gas path with only said first end coupled to a surface of a gas turbine engine gas path component.

3. The system in accordance with claim 1, wherein said at least one filament is configured to extend with slack across a gas path, said controller configured to generate a three-dimensional temperature map across the gas path at least partially representative of the thermal radiation emitted by said at least one filament.

4. The system in accordance with claim 1, further comprising a filament scanning mechanism configured to translate said at least one filament across a gas path, said controller configured to generate a three-dimensional temperature map across the gas path at least partially representative of the thermal radiation emitted by said at least one filament.

5. The system in accordance with claim 1, wherein said at least one filament comprises a plurality of filaments configured to extend across a gas path, said controller configured to generate at least one of a two-dimensional and a three-dimensional temperature map across the gas path at least partially representative of the thermal radiation emitted by at least one of said plurality of filaments.

6. The system in accordance with claim 1, wherein said at least one filament comprises silicon carbide.

7. The system in accordance with claim 1, wherein said at least one filament comprises a diameter of less than approximately 4.0 millimeters (mm).

8. The system in accordance with claim 1, wherein the at least one relatively narrow wavelength band of thermal radiation includes at least one of:
   a first wavelength band extending at least partially between approximately 400 nanometers (nm) and approximately 1300 nm;
   a second wavelength band extending at least partially between approximately 1500 nm and approximately 1800 nm;
   a third wavelength band extending at least partially between approximately 2000 nm and approximately 2500 nm; and
   a fourth wavelength band extending at least partially between approximately 2500 nm and approximately 4200 nm.

9. The system in accordance with claim 1, wherein said at least one filament comprises at least one of sapphire, fused silica, tungsten, and graphite.

10. The system in accordance with claim 9, wherein said controller is configured to determine a temperature of one or more of said plurality of filaments without correcting for emissivity of any of said plurality of filaments.

11. A gas turbine engine system comprising:
    a combustion chamber configured to generate a flow of hot combustion products;
    a turbine downstream in serial flow communication with said combustion chamber, wherein said combustion chamber and said turbine at least partially define at least a portion of a gas path configured to channel the flow of hot combustion products;
    a temperature measurement system positioned at least partially in said gas path, said temperature monitoring system comprising:
    at least one filament configured to emit thermal radiation in a broad and continuous wavelength band at least partially representative of a temperature of said at least one filament, wherein said at least one filament is configured to extend across said gas path;

an optical system configured to receive at least a portion of the thermal radiation emitted from said at least one filament, said optical system comprising:
  at least one optical component at least partially transparent to the broad and continuous wavelength band of thermal radiation, said optical component positioned between said gas path and an area having a temperature lower than a temperature of the gas path;
  a wavelength splitting device configured to split the emitted thermal radiation into at least one narrow wavelength band of thermal radiation; and
  a detector array configured to receive the at least one narrow wavelength band of thermal radiation and to generate electrical signals at least partially representative of the received thermal radiation; and
a controller communicatively coupled to said detector array, said controller configured to transform the generated electrical signals to a temperature indication using a predetermined conversion module, said controller configured to generate a temperature map across said gas path at least partially representative of the thermal radiation emitted by said at least one filament and further wherein said controller is configured to determine a temperature of said gas through the energy balance between said at least one filament, a flow of said gas and an environment surrounding said at least one filament.

12. The system in accordance with claim 11, further comprising a filament controller configured to control at least one of a position of said at least one filament within said gas path of the generated flow and a tension of said at least one filament.

13. The system in accordance with claim 11, wherein said at least one filament is configured to extend with slack across said gas path, said controller configured to generate a three-dimensional temperature map across said gas path at least partially representative of the thermal radiation emitted by said at least one filament.

14. The system in accordance with claim 11, further comprising a filament scanning mechanism configured to translate said at least one filament across said gas path, said controller configured to generate a three-dimensional temperature map across the gas path at least partially representative of the thermal radiation emitted by said at least one filament.

15. The system in accordance with claim 11, wherein said at least one filament comprises a plurality of filaments configured to extend across said gas path, said controller configured to generate at least one of a two-dimensional and a three-dimensional temperature map across said gas path at least partially representative of the thermal radiation emitted by at least one of said plurality of filaments.

\* \* \* \* \*